(12) United States Patent
Chen et al.

(10) Patent No.: US 7,869,142 B2
(45) Date of Patent: Jan. 11, 2011

(54) OPTICAL LENS SYSTEM FOR TAKING IMAGE

(75) Inventors: Chun-Shan Chen, Taichung (TW); Hsiang-Chi Tang, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/351,836

(22) Filed: Jan. 10, 2009

(65) Prior Publication Data

US 2010/0149659 A1 Jun. 17, 2010

(30) Foreign Application Priority Data

Dec. 16, 2008 (TW) .............................. 97148958 A

(51) Int. Cl.
*G02B 9/36* (2006.01)
*G02B 13/18* (2006.01)
*G02B 3/02* (2006.01)

(52) U.S. Cl. ...................................... 359/775; 359/715
(58) Field of Classification Search ................ 359/688, 359/650, 772, 775, 778, 715
See application file for complete search history.

(56) References Cited

U.S. PATENT DOCUMENTS 7,277,238 B2 * 10/2007 Noda .......................... 359/715
2008/0186594 A1 * 8/2008 Jeong et al. .................. 359/775

* cited by examiner

*Primary Examiner*—Alicia M Harrington
(74) *Attorney, Agent, or Firm*—Banger Shia

(57) ABSTRACT

An optical lens system for taking image has, in order from the object side to the image side: a positive first lens element with a convex object-side surface; a negative plastic second lens element with a concave object-side surface; a negative plastic third lens element with a concave object-side surface; a positive fourth lens element with a concave image-side surface; and an aperture stop located between an object to be photographed and the second lens element. The second lens element is provided with at least one aspheric surface, the third lens element is provided with at least one aspheric surface, and the fourth lens element is formed with inflection points. An on-axis distance between the first and second lens elements is T12, a focal length of the optical lens system for taking image is f, they satisfy the relation: (T12/f)*100>0.7.

20 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional mobile phone camera usually consists of three lens elements: from the object side to the image side: a first lens element with positive refractive power, a second lens element with negative refractive power and a third lens element with positive refractive power, such as the optical lens system for taking image described in U.S. Pat. No. 7,145,736. As the pixel size of electronic imaging sensors gradually becomes smaller and smaller, the system requires higher image quality. The conventional optical lens system comprising three lens elements cannot satisfy the requirements of higher resolution optical lens systems.

U.S. Pat. No. 7,365,920 discloses a four-piece lens assembly, in which the first lens element and the second lens element, which are both glass spherical lens elements, are bonded to each other to form a doublet lens element for eliminating chromatic aberration. However, it suffers from the following disadvantages: the degree of freedom available in the optical system is insufficient since there are too many glass spherical lens elements; and the manufacturing difficulty is increased due to the difficult process of bonding the glass lens elements.

The present invention mitigates and/or obviates the aforementioned disadvantages.

SUMMARY OF THE INVENTION

The primary objective of the present invention is to provide an optical lens system for taking image comprising four lens elements to improve image quality, effectively reduce the total track length of the optical lens system and maintain the objective of miniaturization of the optical lens system.

An optical lens system for taking image in accordance with one aspect of the present invention comprises: in order from the object side to the image side: a first lens element with positive refractive power having a convex object-side surface; a second lens element with negative refractive power; a third lens element with negative refractive power; a fourth lens element with positive refractive power having a concave image-side surface; and an aperture stop being located between an object to be photographed and the second lens element. In the optical lens system for taking image, the number of the lens elements with refractive power is limited to four. Such an arrangement of lens elements can effectively improve image quality of the optical system and maintain the objective of miniaturization of the optical lens system.

In the present optical lens system for taking image, the refractive power of the system is mainly provided by the first lens element with positive refractive power. The second lens element with negative refractive power mainly serves to correct chromatic aberration. The third lens element and the fourth lens element serve as correction lens elements to balance and correct various aberrations caused by the optical lens system. In addition, by alternating the third lens element and the fourth lens element with negative and positive refractive powers, the coma of the system can be corrected, and excessive increase of other aberrations can be prevented.

The first lens element provides a strong positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. The inflection points formed on the fourth lens element will contribute to a better correction of the incident angle of the off axis light with respect to the sensor.

In addition, for wide angle optical systems, it is especially necessary to correct the distortion and the chromatic aberration of magnification, and this can be solved by locating the aperture stop at the balance point of the refractive power of the system. In the present optical lens system for taking image, if the aperture stop is located in front of the first lens element, the telecentric feature of the optical lens system is emphasized, and the total track length of the optical lens system will become shorter. If the aperture stop is located between the first and second lens elements, the wide field of view is emphasized, and the optical system is less sensitive as well.

With the trend of miniaturization of the optical lens system and the requirement of increasing the field of view, the focal length of the optical lens system is becoming very short. Therefore, the radius of curvature and the size of the lens elements must be very small, and it is difficult to make such glass lens elements by the use of conventional grinding. If plastic material is introduced to make lens elements by injection molding, high precision lens elements can be produced at a relatively low cost. If glass material is introduced to make lens elements, high precision lens elements can also be produced by using molded glass. The lens elements are provided with aspheric surfaces, allowing more design parameter freedom (than spherical surfaces), so as to better reduce aberrations and the number of the lens elements, thus effectively reducing the total track length of the optical lens system.

According to another aspect of the present invention, in the present optical lens system for taking image, the focal length of the optical lens system for taking image is f, the focal length of the first lens element is f1, and they satisfy the relation:

$$1.20 < f/f1 < 1.80.$$

If f/f1 satisfies the above relation, the refractive power of the first lens element is more balanced and the total track length of the optical lens system can be effectively controlled, so as to maintain the objective of miniaturization of the optical lens system for taking image. At the same time, it can also prevent the excessive increase of high order spherical aberration and coma of the system, improving the image quality of the optical lens system. Further, it will be better if f/f1 satisfies the relation:

$1.45 < f/f1 < 1.80$.

According to another aspect of the present invention, in the present optical lens system for taking image, the focal length of the optical lens system for taking image is f, the focal length of the third lens element is f3, the focal length of the fourth lens element is f4, and they satisfy the relations:

$-0.2 < f/f3 < 0$;

$0 \leq f/f4 < 0.2$.

If f/f3 and f/f4 satisfy the above relations, the third lens element and the fourth lens element serve as correction lens elements to balance and correct various aberrations caused by the optical lens system, it will be favorable to correct the astigmatism and the distortion caused by the optical lens system, improving the resolution of the optical lens system. Further, it will be better if f/f3 satisfies the relation:

$-0.2 < f/f3 < -0.02$.

According to another aspect of the present invention, in the present optical lens system for taking image, the on-axis distance between the first lens element and the second lens element is T12, the on-axis distance between the third lens element and the fourth lens element is T34, the focal length of the optical lens system for taking image is f, and they satisfy the relations:

$(T12/f)*100 > 0.7$;

$(T34/f)*100 < 3.0$.

The above relation can allow better correction of the higher order aberrations of the system.

According to another aspect of the present invention, in the present optical lens system for taking image, the radius of curvature of the object-side surface of the first lens element is R1, the radius of curvature of the image-side surface of the first lens element is R2, and they satisfy the relation:

$|R1/R2| < 0.3$.

If R1/R2 satisfies the above relation, it will be favorable to correct the spherical aberration caused by the system. Further, it will be better if R1/R2 satisfies the relation:

$|R1/R2| < 0.15$.

According to another aspect of the present invention, in the present optical lens system for taking image, the radius of curvature of the object-side surface of the second lens element is R3, the radius of curvature of the image-side surface of the second lens element is R4, and they satisfy the relation:

$(R3+R4)/(R3-R4) < 1.9$.

The above relation will be favorable to correct the Petzval sum of the optical lens system.

According to another aspect of the present invention, in the present optical lens system for taking image, an object to be photographed is imaged on an electronic imaging sensor, the total track length of the optical lens system for taking image is TTL, which is defined as a distance from the object-side surface of the first lens element to the image plane along the optical axis, the maximum image height of the optical lens system for taking image is ImgH, which is defined as half of the length of the diagonal of the electronic imaging sensor's effective pixel region, and they satisfy the relation:

$TTL/ImgH < 2.15$.

The above relation can maintain the objective of miniaturization of the optical lens system for taking image. Further, it will be better if TTL/ImgH satisfies the relation:

$TTL/ImgH < 1.90$.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
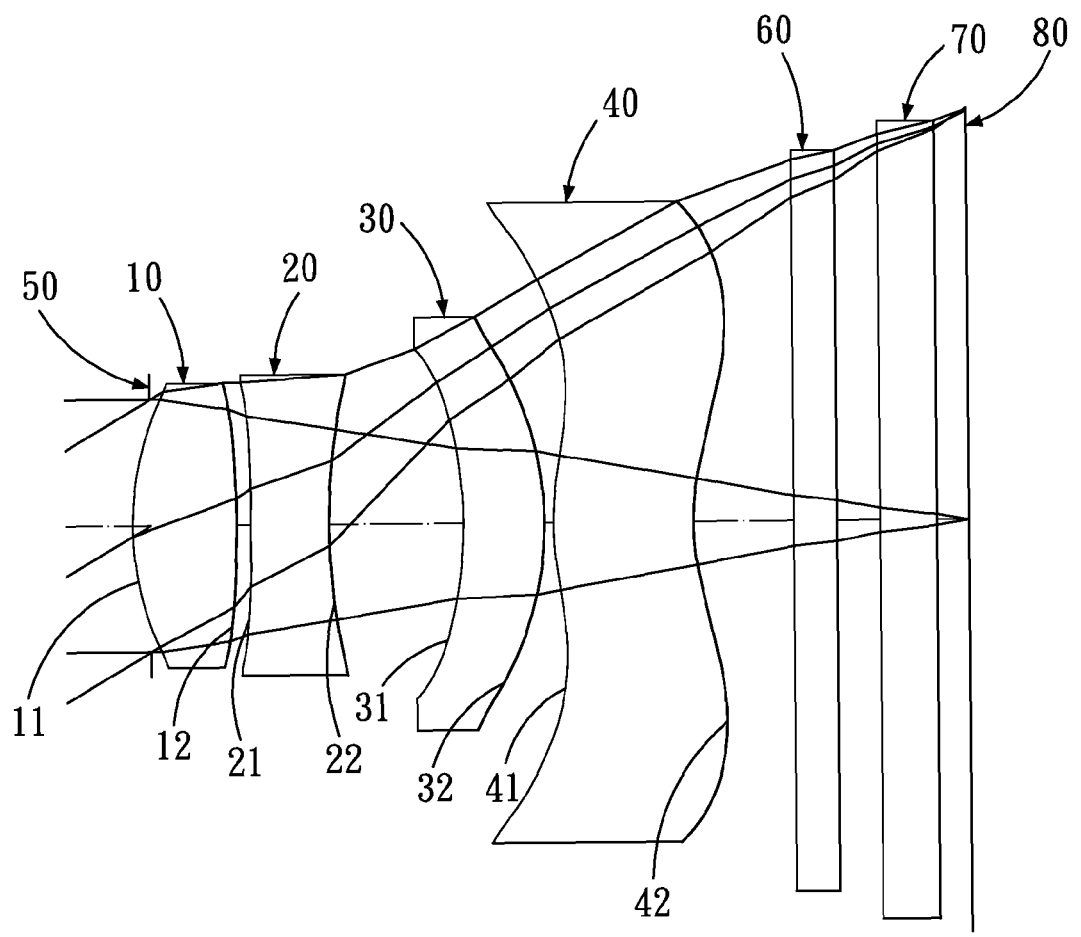
FIG. 1 shows an optical lens system for taking image in accordance with a first embodiment of the present invention.
Figure 2:
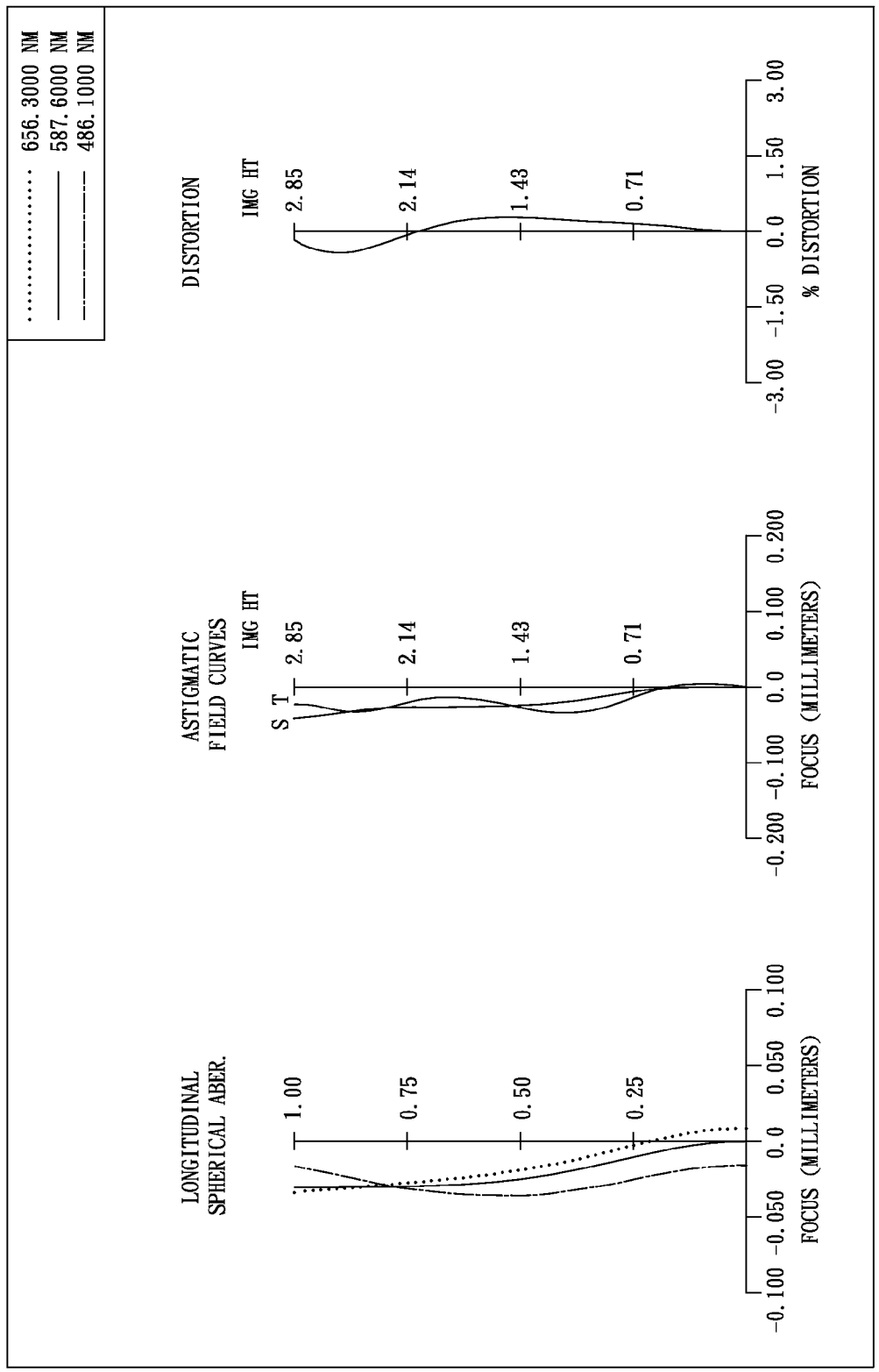
FIG. 2 shows the aberration curves of the first embodiment of the present invention.

Referring to FIG. 1, which shows an optical lens system for taking image in accordance with a first embodiment of the present invention, and FIG. 2 shows the aberration curves of the first embodiment of the present invention. An optical lens system for taking image in accordance with the first embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a concave image-side surface 22, and the object-side surface 21 and the image-side surface 22 of the second lens element 20 are aspheric.

A plastic third lens element 30 with negative refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

A sensor cover glass 70 is located behind the IR cut filter 60.

An image plane 80 is located behind the sensor cover glass 70.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the third lens element is f3, the focal length of the fourth lens element is f4, and they satisfy the relations:

f=4.91 mm;

f/f1=1.45;

f/f3=−0.05;

f/f4=0.05.

In the first embodiment of the present optical lens system for taking image, the focal length of the optical lens system for taking image is f, the on-axis distance between the first lens element and the second lens element is T12, and they satisfy the relation:

(T12/f)*100=2.0.

In the first embodiment of the present optical lens system for taking image, the focal length of the optical lens system for taking image is f, the on-axis distance between the third lens element and the fourth lens element is T34, and they satisfy the relation:

(T34/f)*100=1.4.

In the first embodiment of the present optical lens system for taking image, the radius of curvature of the object-side surface of the first lens element is R1, the radius of curvature of the image-side surface of the first lens element is R2, and they satisfy the relation:

|R1/R2|=0.11.

In the first embodiment of the present optical lens system for taking image, the radius of curvature of the object-side surface of the second lens element is R3, the radius of curvature of the image-side surface of the second lens element is R4, and they satisfy the relation:

(R3+R4)/(R3−R4)=0.82.

In the first embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

TTL/ImgH=1.96.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 4.91 mm, Fno = 2.8, HFOV (half of field of view) = 30.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.122 | | | | |
| 2 | Lens 1 | 2.01425(ASP) | 0.721 | Plastic | 1.544 | 55.9 | 3.38 |
| 3 | | −18.76480(ASP) | 0.100 | | | | |
| 4 | Lens 2 | −46.86700(ASP) | 0.550 | Plastic | 1.632 | 23.4 | −6.73 |
| 5 | | 4.69770(ASP) | 0.937 | | | | |
| 6 | Lens 3 | −2.09486(ASP) | 0.556 | Plastic | 1.530 | 55.8 | −105.94 |
| 7 | | −2.37611(ASP) | 0.070 | | | | |
| 8 | Lens 4 | 1.85930(ASP) | 0.972 | Plastic | 1.530 | 55.8 | 100.55 |
| 9 | | 1.57766(ASP) | 0.700 | | | | |
| 10 | IR-filter | Plano | 0.300 | Glass | 1.517 | 64.2 | |
| 11 | | Plano | 0.300 | | | | |
| 12 | Sensor cover glass | Plano | 0.400 | Glass | 1.517 | 64.2 | |
| 13 | | Plano | 0.222 | | | | |
| 14 | Image | Plano | | | | | |

TABLE 2

Aspheric Coefficients

| | Surface# | | | |
|---|---|---|---|---|
| | 2 | 3 | 4 | 5 |
| k = | −3.30366E−01 | 0.00000E+00 | 0.00000E+00 | −7.95134E+00 |
| A4 = | 2.36612E−03 | −2.84867E−02 | −2.51581E−02 | 2.26805E−02 |
| A6 = | −7.94390E−03 | −6.21274E−02 | −8.36319E−02 | −4.03089E−02 |
| A8 = | 5.85432E−03 | 1.69169E−02 | 5.12692E−02 | 2.60131E−02 |
| A10 = | −1.46194E−02 | 4.86453E−03 | 7.42605E−03 | |

| | Surface# | | | |
|---|---|---|---|---|
| | 6 | 7 | 8 | 9 |
| k = | −2.32345E+01 | 1.63110E−01 | −1.27549E+01 | −6.11314E+00 |
| A4 = | −1.80470E−02 | −9.67362E−03 | −9.84532E−02 | −5.41341E−02 |
| A6 = | −4.50186E−02 | 4.17954E−04 | 1.43874E−02 | 9.93040E−03 |
| A8 = | 1.94015E−02 | 2.06950E−03 | 1.29109E−03 | −1.57739E−03 |
| A10 = | −6.14233E−03 | −8.06192E−04 | −2.84100E−04 | 7.15239E−05 |
| A12 = | 5.50753E−04 | 5.48087E−04 | −2.05975E−05 | 8.24324E−06 |
| A14 = | −3.37428E−03 | 2.20343E−04 | −1.24354E−05 | −2.55392E−07 |
| A16 = | 1.18522E−03 | −6.19409E−05 | 2.76072E−06 | −1.35298E−07 |

Figure 3:
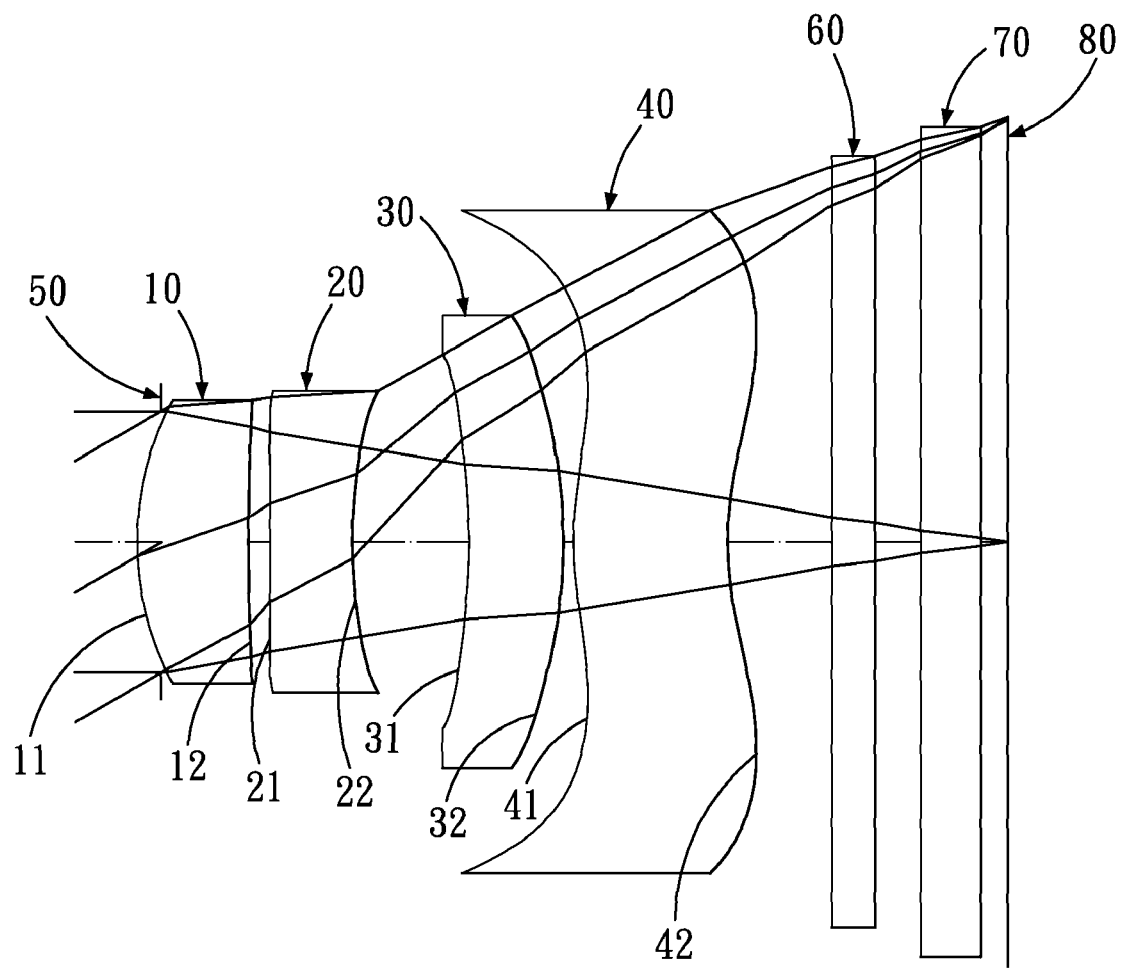
FIG. 3 shows an optical lens system for taking image in accordance with a second embodiment of the present invention.
Figure 4:
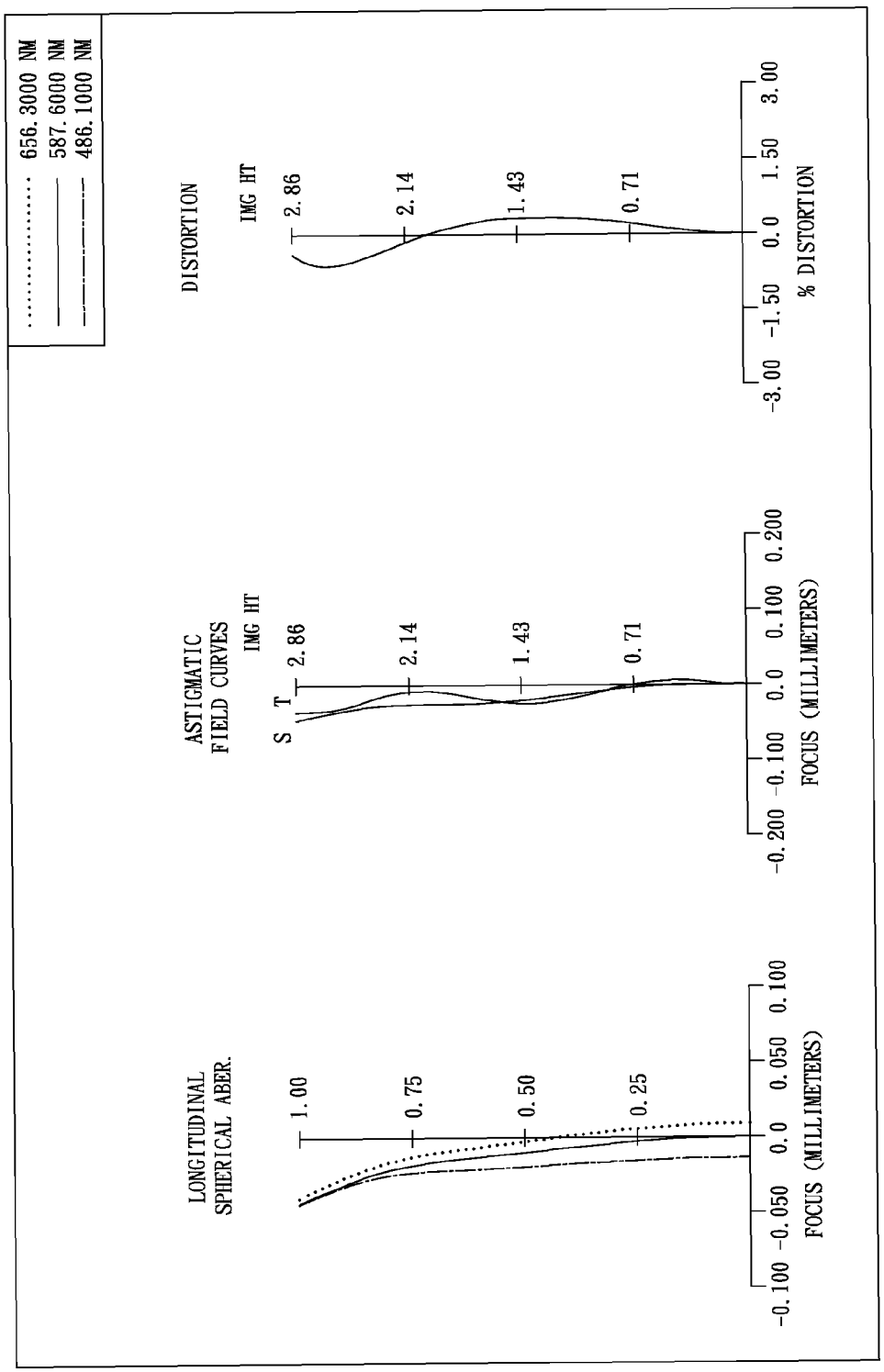
FIG. 4 shows the aberration curves of the second embodiment of the present invention.

Referring to FIG. 3, which shows an optical lens system for taking image in accordance with a second embodiment of the present invention, and FIG. 4 shows the aberration curves of the second embodiment of the present invention. An optical lens system for taking image in accordance with the second embodiment of the present invention comprises: in order from the object side to the image side:

An aperture stop 50.

A glass first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with negative refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

A sensor cover glass 70 is located behind the IR cut filter 60.

An image plane 80 is located behind the sensor cover glass 70.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the third lens element is f3, the focal length of the fourth lens element is f4, and they satisfy the relations:

$f=4.97$ mm;

$f/f1=1.42$;

$f/f3=-0.05$;

$f/f4=0.12$.

In the second embodiment of the present optical lens system for taking image, the focal length of the optical lens system for taking image is f, the on-axis distance between the first lens element and the second lens element is T12, and they satisfy the relation:

$(T12/f)*100=2.8$.

In the second embodiment of the present optical lens system for taking image, the focal length of the optical lens system for taking image is f, the on-axis distance between the third lens element and the fourth lens element is T34, and they satisfy the relation:

$(T34/f)*100=1.4$.

In the second embodiment of the present optical lens system for taking image, the radius of curvature of the object-side surface of the first lens element is R1, the radius of curvature of the image-side surface of the first lens element is R2, and they satisfy the relation:

$|R1/R2|=0.10$.

In the second embodiment of the present optical lens system for taking image, the radius of curvature of the object-side surface of the second lens element is R3, the radius of curvature of the image-side surface of the second lens element is R4, and they satisfy the relation:

$(R3+R4)/(R3-R4)=1.08$.

In the second embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=1.97$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 4.97 mm, Fno = 2.8, HFOV (half of field of view) = 30.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.166 | | | | |
| 2 | Lens 1 | 2.00000(ASP) | 0.760 | Glass | 1.623 | 58.2 | 3.50 |
| 3 | | 20.46640(ASP) | 0.139 | | | | |
| 4 | Lens 2 | 100.00000(ASP) | 0.550 | Plastic | 1.632 | 23.4 | −6.57 |
| 5 | | 3.97790(ASP) | 0.794 | | | | |
| 6 | Lens 3 | −3.16820(ASP) | 0.633 | Plastic | 1.530 | 55.8 | −99.33 |
| 7 | | −3.60440(ASP) | 0.070 | | | | |
| 8 | Lens 4 | 2.16543(ASP) | 1.037 | Plastic | 1.530 | 55.8 | 41.90 |
| 9 | | 2.00139(ASP) | 0.700 | | | | |
| 10 | IR-filter | Plano | 0.300 | Glass | 1.517 | 64.2 | |
| 11 | | Plano | 0.300 | | | | |
| 12 | Sensor cover glass | Plano | 0.400 | Glass | 1.517 | 64.2 | |
| 13 | | Plano | 0.184 | | | | |
| 14 | Image | Plano | | | | | |

TABLE 4

Aspheric Coefficients

| | Surface# | | | |
|---|---|---|---|---|
| | 2 | 3 | 4 | 5 |
| k = | −1.76955E−01 | 0.00000E+00 | 0.00000E+00 | 3.89792E+00 |
| A4 = | 2.13829E−03 | −1.42959E−02 | −8.43040E−03 | 3.32629E−02 |
| A6 = | 4.07278E−03 | −1.03469E−03 | −2.20983E−02 | −3.23436E−02 |
| A8 = | −7.67581E−03 | −1.07787E−02 | 2.10281E−02 | 3.88824E−02 |
| A10 = | 5.76963E−03 | 2.76449E−02 | 2.39209E−02 | −1.57306E−02 |
| A12 = | | | −7.76640E−03 | 7.42016E−03 |

| | Surface# | | | |
|---|---|---|---|---|
| | 6 | 7 | 8 | 9 |
| k = | −4.04977E+01 | 2.75125E−01 | −1.32393E+01 | −6.65353E+01 |
| A4 = | 3.36439E−02 | −1.02319E−02 | −7.70966E−02 | −4.78872E−02 |
| A6 = | −4.28830E−02 | 2.00185E−02 | 1.54346E−02 | 8.92690E−03 |
| A8 = | 2.05715E−02 | −4.97769E−03 | 3.48639E−05 | −1.67952E−02 |
| A10 = | −5.71321E−03 | −6.68014E−04 | −8.80881E−04 | 1.56288E−04 |
| A12 = | −1.57644E−03 | | 9.71317E−05 | −7.12682E−06 |

Figure 5:
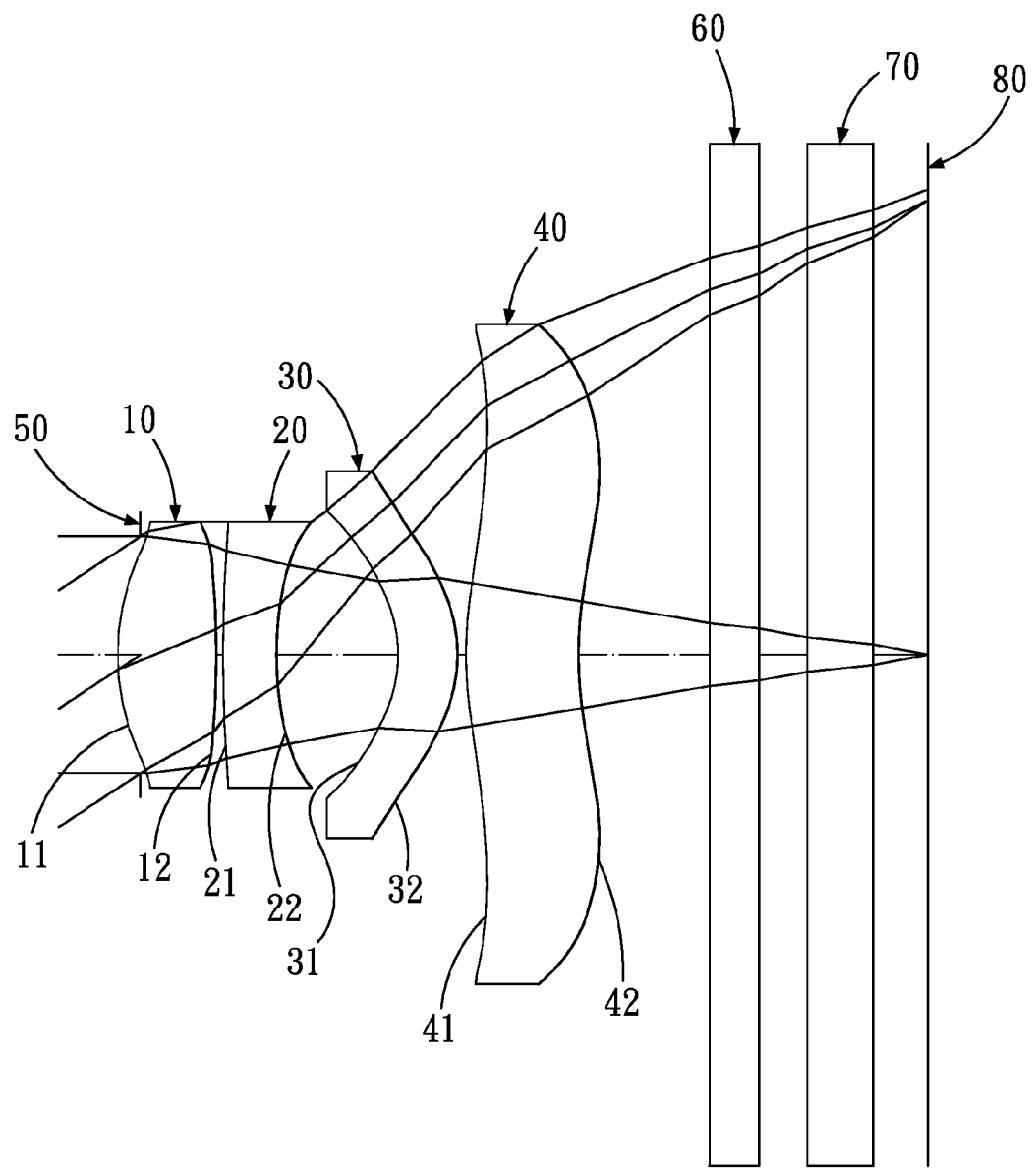
FIG. 5 shows an optical lens system for taking image in accordance with a third embodiment of the present invention.
Figure 6:
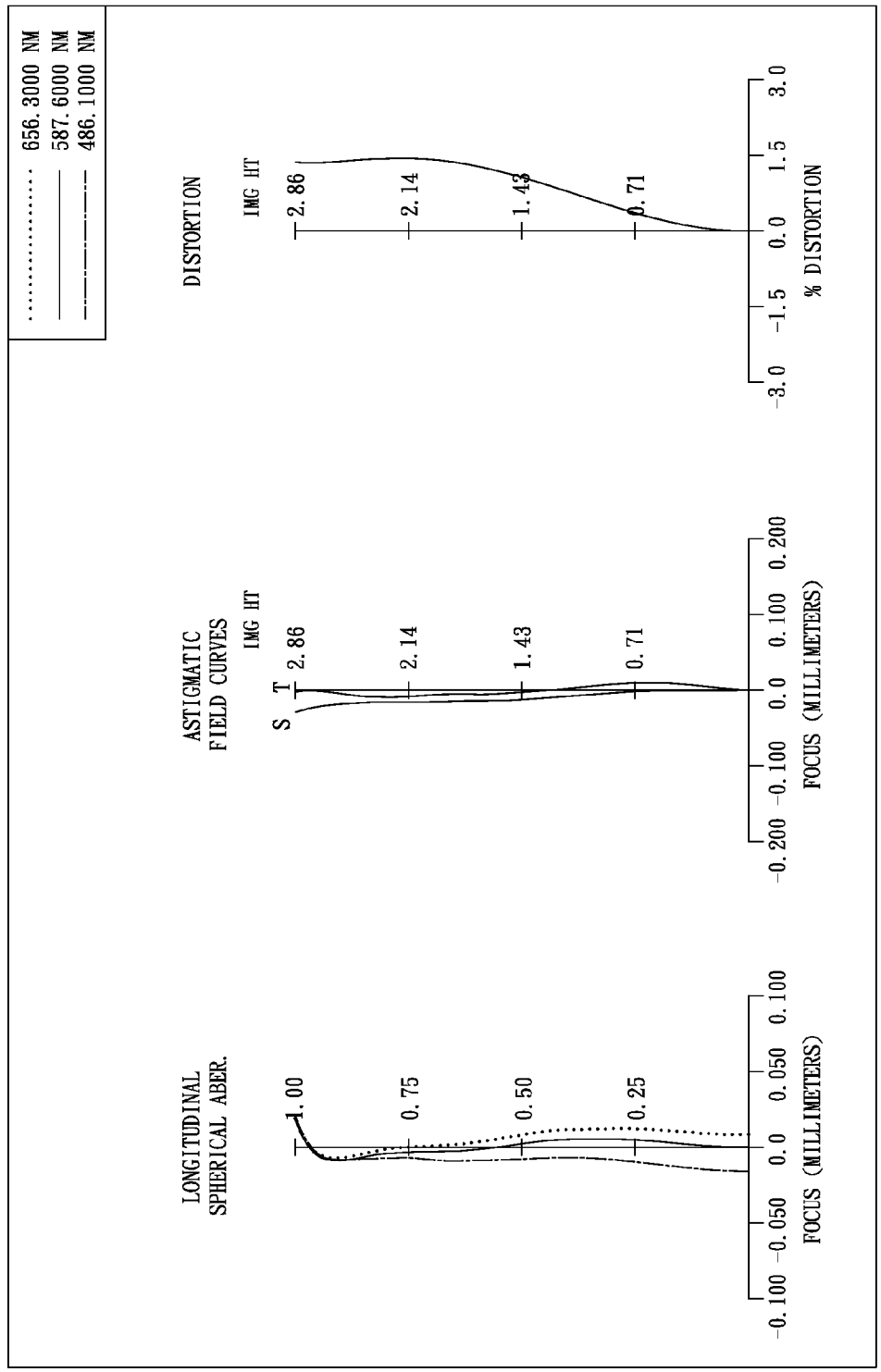
FIG. 6 shows the aberration curves of the third embodiment of the present invention.

Referring to FIG. 5, which shows an optical lens system for taking image in accordance with a third embodiment of the present invention, and FIG. 6 shows the aberration curves of the third embodiment of the present invention. An optical lens system for taking image in accordance with the third embodiment of the present invention comprises: in order from the object side to the image side:

An aperture stop 50.

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a convex object-side surface 21 and a concave image-side surface 22, and the object-side surface 21 and the image-side surface 22 of the second lens element 20 are aspheric.

A plastic third lens element 30 with negative refractive power has a concave object-side surface 31 and a convex image-side surface 32, and the object-side surface 31 and the image-side surface 32 of the third lens element 30 are aspheric.

A plastic fourth lens element 40 with positive refractive power has a convex object-side surface 41 and a concave image-side surface 42, the object-side surface 41 and the image-side surface 42 of the fourth lens element 40 are aspheric, and inflection points are formed on the object-side surface 41 and the image-side surface 42 of the fourth lens element 40.

An IR cut filter 60 is located behind the fourth lens element 40 and has no influence on the focal length of the optical lens system.

A sensor cover glass 70 is located behind the IR cut filter 60.

An image plane 80 is located behind the sensor cover glass 70.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the third lens element is f3, the focal length of the fourth lens element is f4, and they satisfy the relations:

f=4.24 mm;

$f/f1$=1.61;

$f/f3$=−0.03;

$f/f4$=0.11.

In the third embodiment of the present optical lens system for taking image, the focal length of the optical lens system for taking image is f, the on-axis distance between the first lens element and the second lens element is T12, and they satisfy the relation:

$(T12/f)*100$=1.2.

In the third embodiment of the present optical lens system for taking image, the focal length of the optical lens system for taking image is f, the on-axis distance between the third lens element and the fourth lens element is T34, and they satisfy the relation:

$(T34/f)*100$=1.2

In the third embodiment of the present optical lens system for taking image, the radius of curvature of the object-side surface of the first lens element is R1, the radius of curvature of the image-side surface of the first lens element is R2, and they satisfy the relation:

$|R1/R2|$=0.06.

In the third embodiment of the present optical lens system for taking image, the radius of curvature of the object-side surface of the second lens element is R3, the radius of curvature of the image-side surface of the second lens element is R4, and they satisfy the relation:

$(R3+R4)/(R3−R4)$=1.65.

In the third embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

TTL/Img$H$=1.65.

The detailed optical data of the third embodiment is shown in table 5, and the aspheric surface data is shown in table 6, wherein the units of the radius of curvature, the thickness and the focal length are expressed in mm, and HFOV is half of the maximal field of view.

TABLE 5

(Embodiment 3)
f(focal length) = 4.24 mm, Fno = 2.85, HFOV (half of field of view) = 33.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.140 | | | | |
| 2 | Lens 1 | 1.51834(ASP) | 0.599 | Plastic | 1.544 | 55.9 | 2.64 |
| 3 | | −23.73770(ASP) | 0.050 | | | | |
| 4 | Lens 2 | 9.67360(ASP) | 0.320 | Plastic | 1.632 | 23.4 | −5.03 |
| 5 | | 2.36057(ASP) | 0.745 | | | | |
| 6 | Lens 3 | −0.84316(ASP) | 0.364 | Plastic | 1.544 | 55.9 | −165.01 |
| 7 | | −0.98064(ASP) | 0.050 | | | | |
| 8 | Lens 4 | 2.01556(ASP) | 0.691 | Plastic | 1.530 | 55.8 | 38.77 |
| 9 | | 1.96939(ASP) | 0.800 | | | | |
| 10 | IR-filter | Plano | 0.300 | Glass | 1.517 | 64.2 | |
| 11 | | Plano | 0.300 | | | | |
| 12 | Sensor cover glass | Plano | 0.400 | Glass | 1.517 | 64.2 | |
| 13 | | Plano | 0.335 | | | | |
| 14 | Image | Plano | | | | | |

TABLE 6

Aspheric Coefficients

| | Surface# | | | |
|---|---|---|---|---|
| | 2 | 3 | 4 | 5 |
| k = | −9.47626E−01 | −4.36046E+02 | −3.63390E+02 | −4.55198E+00 |
| A4 = | 7.29182E−03 | −1.27714E−01 | 3.89137E−03 | 1.26188E−01 |
| A6 = | −8.03325E−03 | −7.93891E−03 | −1.58039E−02 | 3.48470E−02 |
| A8 = | −4.11333E−02 | −6.88375E−02 | 1.51037E−02 | 6.36796E−02 |
| A10 = | −2.20049E−01 | −3.98449E−02 | −1.08148E−01 | −1.60320E−01 |
| A12 = | 3.60374E−01 | 8.91153E−02 | 3.11765E−01 | 8.97582E−02 |
| A14 = | −5.25833E−02 | 5.88562E−02 | −6.51139E−02 | 3.43467E−01 |

TABLE 6-continued

Aspheric Coefficients

| | | | | |
|---|---|---|---|---|
| A16 = | −3.80868E−01 | −2.29593E−01 | −1.94268E−01 | −3.25355E−01 |

| | Surface# | | | |
|---|---|---|---|---|
| | 6 | 7 | 8 | 9 |
| k = | −4.30965E+00 | −1.50340E+00 | −1.88859E+01 | −1.33580E+01 |
| A4 = | −3.64845E−01 | −3.60781E−02 | −7.21243E−02 | −6.78385E−02 |
| A6 = | 3.14630E−01 | −3.07211E−03 | 3.79901E−02 | 1.96378E−02 |
| A8 = | 1.15843E−02 | 8.19925E−02 | −1.06076E−02 | −5.07918E−03 |
| A10 = | −8.04019E−02 | 5.64560E−02 | 1.22210E−03 | 6.82124E−04 |
| A12 = | −3.25299E−01 | −4.96281E−02 | 1.20602E−04 | −2.86066E−06 |
| A14 = | 7.30142E−01 | −4.72385E−02 | −7.00950E−05 | −1.28810E−05 |
| A16 = | −5.88094E−01 | 2.73407E−02 | 8.21767E−06 | 7.72468E−07 |

TABLE 7

| | Embodiment 1 | Embodiment 2 | Embodiment 3 |
|---|---|---|---|
| f | 4.91 | 4.97 | 4.24 |
| Fno | 2.80 | 2.80 | 2.85 |
| HFOV | 30.3 | 30.1 | 33.7 |
| (T12/f) * 100 | 2.0 | 2.8 | 1.2 |
| (T34/f) * 100 | 1.4 | 1.4 | 1.2 |
| \|R1/R2\| | 0.11 | 0.10 | 0.06 |
| (R3 + R4)/(R3 − R4) | 0.82 | 1.08 | 1.65 |
| f/f1 | 1.45 | 1.42 | 1.61 |
| f/f3 | −0.05 | −0.05 | −0.03 |
| f/f4 | 0.05 | 0.12 | 0.11 |
| TTL/ImgH | 1.96 | 1.97 | 1.65 |

In the present optical lens system for taking image, the lens elements can be made of glass or plastic. If the lens elements are made of glass, there is more freedom to distribute the refractive power of the optical lens system. If the lens elements are made of plastic, the cost will be effectively reduced.

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention.

While we have shown and described various embodiments in accordance with the present invention, it should be clear to those skilled in the art that further embodiments may be made without departing from the scope of the present invention.

What is claimed is:

1. An optical lens system for taking image comprising, in order from the object side to the image side:
   a first lens element with positive refractive power having a convex object-side surface;
   a plastic second lens element with negative refractive power having a concave object-side surface and being provided with at least one aspheric surface;
   a plastic third lens element with negative refractive power having a concave object-side surface and being provided with at least one aspheric surface;
   a fourth lens element with positive refractive power having a concave image-side surface, inflection points being formed on the fourth lens element; and
   an aperture stop being located between an object to be photographed and the second lens element, an on-axis distance between the first lens element and the second lens element being T12, a focal length of the optical lens system for taking image being f, they satisfying the relation:

$(T12/f)*100>0.7;$ in the optical lens system for taking image, the number of the lens elements with refractive power being limited to four.

2. The optical lens system for taking image as claimed in claim 1, wherein the aperture stop is located before the first lens element.

3. The optical lens system for taking image as claimed in claim 2, wherein the first lens element is provided with at least one aspheric surface and is made of plastic material, the focal length of the optical lens system for taking image is f, a focal length of the first lens element is f1, and they satisfy the relation:

$1.20<f/f1<1.80.$

4. The optical lens system for taking image as claimed in claim 3, wherein an on-axis distance between the third lens element and the fourth lens element is T34, the focal length of the optical lens system for taking image is f, and they satisfy the relation:

$(T34/f)*100<3.0.$

5. The optical lens system for taking image as claimed in claim 4, wherein the focal length of the optical lens system for taking image is f, a focal length of the third lens element is f3, they satisfy the relation:

$-0.2<f/f3<-0.02;$ the focal length of the optical lens system for taking image is f, a focal length of the fourth lens element is f4, and they satisfy the relation:

$0<f/f4<0.2;$

6. The optical lens system for taking image as claimed in claim 2, wherein a radius of curvature of the object-side surface of the first lens element is R1, a radius of curvature of an image-side surface of the first lens element is R2, and they satisfy the relation:

$|R1/R2|<0.3.$

7. The optical lens system for taking image as claimed in claim 1, wherein the object to be photographed is imaged on an electronic imaging sensor, a total track length of the optical lens system for taking image is TTL, a maximum image height of the optical lens system for taking image is ImgH, and they satisfy the relation:

$TTL/ImgH<2.15$.

8. An optical lens system for taking image comprising, in order from the object side to the image side:
a first lens element with positive refractive power having a convex object-side surface and a concave image-side surface;
a second lens element with negative refractive power having a concave image-side surface;
a third lens element with negative refractive power;
a fourth lens element with positive refractive power having a concave image-side surface, inflection points being formed on the fourth lens element; and
an aperture stop being located between an object to be photographed and the second lens element, an on-axis distance between the first lens element and the second lens element being T12, a focal length of the optical lens system for taking image being f, they satisfying the relation:

$(T12/f)*100>0.7$;

in the optical lens system for taking image, the number of the lens elements with refractive power being limited to four.

9. The optical lens system for taking image as claimed in claim 8, wherein the first lens element is provided with at least one aspheric surface, the second lens element is provided with at least one aspheric surface and is made of plastic material, the third lens element is provided with at least one aspheric surface and is made of plastic material, and an object-side surface of the third lens element is concave.

10. The optical lens system for taking image as claimed in claim 9, wherein the aperture stop is located before the first lens element.

11. The optical lens system for taking image as claimed in claim 10, wherein the focal length of the optical lens system for taking image is f, a focal length of the first lens element is f1, and they satisfy the relation:

$1.20<f/f1<1.80$.

12. The optical lens system for taking image as claimed in claim 11, wherein an on-axis distance between the third lens element and the fourth lens element is T34, the focal length of the optical lens system for taking image is f, and they satisfy the relation:

$(T34/f)*100<3.0$.

13. The optical lens system for taking image as claimed in claim 12, wherein the focal length of the optical lens system for taking image is f, a focal length of the third lens element is f3, they satisfy the relation:

$-0.2<f/f3<-0.02$;

the focal length of the optical lens system for taking image is f, a focal length of the fourth lens element is f4, and they satisfy the relation:

$0<f/f4<0.2$.

14. The optical lens system for taking image as claimed in claim 10, wherein an object-side surface of the second lens element is convex, an image-side surface of the third lens element is convex, the focal length of the optical lens system for taking image is f, a focal length of the third lens element is f3, and they satisfy the relation:

$f/f3<-0.02$.

15. The optical lens system for taking image as claimed in claim 10, wherein a radius of curvature of the object-side surface of the second lens element is R3, a radius of curvature of the image-side surface of the second lens element is R4, and they satisfy the relation:

$(R3+R4)/(R3-R4)<1.9$.

16. The optical lens system for taking image as claimed in claim 8, wherein the object to be photographed is imaged on an electronic imaging sensor, a total track length of the optical lens system for taking image is TTL, a maximum image height of the optical lens system for taking image is ImgH, and they satisfy the relation:

$TTL/ImgH<2.15$.

17. An optical lens system for taking image comprising, in order from the object side to the image side:
a first lens element with positive refractive power having a convex object-side surface and a convex image-side surface;
a second lens element with negative refractive power;
a third lens element with negative refractive power;
a fourth lens element with positive refractive power having a concave image-side surface, inflection points being formed on the fourth lens element; and
an aperture stop being located between an object to be photographed and the first lens element, a focal length of the optical lens system for taking image being f, a focal length of the first lens element being f1, an on-axis distance between the first lens element and the second lens element being T12, an on-axis distance between the third lens element and the fourth lens element being T34, they satisfying the relations:

$1.45<f/f1<1.80$;

$(T12/f)*100>0.7$;

$(T34/f)*100<3.0$;

in the optical lens system for taking image, the number of the lens elements with refractive power being limited to four;
wherein an image-side surface of the second lens element is concave;
the first lens element is provided with at least one aspheric surface, an object-side surface of the second lens element is convex, the second lens element is provided with at least one aspheric surface and is made of plastic material, an object-side surface of the third lens element is concave, an image-side surface of the third lens element is convex, and the third lens element is provided with at least one aspheric surface and is made of plastic material.

18. An optical lens system for taking image comprising, in order from the object side to the image side:
a first lens element with positive refractive power having a convex object-side surface and a convex image-side surface;
a second lens element with negative refractive power;
a third lens element with negative refractive power;
a fourth lens element with positive refractive power having a concave image-side surface, inflection points being formed on the fourth lens element; and
an aperture stop being located between an object to be photographed and the first lens element, a focal length of the optical lens system for taking image being f, a focal length of the first lens element being f1, an on-axis distance between the first lens element and the second lens element being T12, a radius of curvature of the object-side surface of the first lens element being R1, a radius of curvature of the image-side surface of the first lens element being R2, and they satisfying the relation:

$1.45 < f/f1 < 1.80;$ $(T12/f)*100 > 0.7;$ $|R1/R2| < 0.15$ in the optical lens system for taking image, the number of the lens elements with refractive power being limited to four;

wherein an image-side surface of the second lens element is concave;

the first lens element is provided with at least one aspheric surface, an object-side surface of the second lens element is convex, the second lens element is provided with at least one aspheric surface and is made of plastic material, an object-side surface of the third lens element is concave, an image-side surface of the third lens element is convex, and the third lens element is provided with at least one aspheric surface and is made of plastic material.

19. An optical lens system for taking image comprising, in order from the object side to the image side:

a first lens element with positive refractive power having a convex object-side surface and a convex image-side surface;

a second lens element with negative refractive power;

a third lens element with negative refractive power;

a fourth lens element with positive refractive power having a concave image-side surface, inflection points being formed on the fourth lens element; and an aperture stop being located between an object to be photographed and the first lens element, a focal length of the first lens element being f1, an on-axis distance between the first lens element and the second lens element being T12, a focal length of the optical lens system for taking image being f, a focal length of the third lens element being f3, a focal length of the fourth lens element being f4, they satisfying the relations:

$-0.2 < f/f3 < 0;$ $0 < f/f4 < 0.2;$ $1.45 < f/f1 < 1.80;$ $(T12/f)*100 > 0.7;$ in the optical lens system for taking image, the number of the lens elements with refractive power being limited to four;

wherein an image-side surface of the second lens element is concave;

the first lens element is provided with at least one aspheric surface, an object-side surface of the second lens element is convex, the second lens element is provided with at least one aspheric surface and is made of plastic material, an object-side surface of the third lens element is concave, an image-side surface of the third lens element is convex, and the third lens element is provided with at least one aspheric surface and is made of plastic material.

20. An optical lens system for taking image comprising, in order from the object side to the image side:

a first lens element with positive refractive power having a convex object-side surface and a convex image-side surface;

a second lens element with negative refractive power;

a third lens element with negative refractive power;

a fourth lens element with positive refractive power having a concave image-side surface, inflection points being formed on the fourth lens element; and an aperture stop being located between an object to be photographed and the second lens element, a focal length of the optical lens system for taking image being f, a focal length of the first lens element being f1, an on-axis distance between the first lens element and the second lens element being T12, the object to be photographed being imaged on the electronic imaging sensor, the total track length of the optical lens system for taking image being TTL, the maximum image height of the optical lens system for taking image being ImgH, and they satisfying the relations:

$TTL/ImgH < 1.90;$ $1.45 < f/f1 < 1.80;$ $(T12/f)*100 > 0.7;$ in the optical lens system for taking image, the number of the lens elements with refractive power being limited to four;

wherein an image-side surface of the second lens element is concave;

the first lens element is provided with at least one aspheric surface, an object-side surface of the second lens element is convex, the second lens element is provided with at least one aspheric surface and is made of plastic material, an object-side surface of the third lens element is concave, an image-side surface of the third lens element is convex, and the third lens element is provided with at least one aspheric surface and is made of plastic material.

* * * * *